United States Patent [19]

Hain et al.

[11] 4,321,861
[45] Mar. 30, 1982

[54] CHEESE MANUFACTURE

[75] Inventors: Gottfried Hain, Lahen; Bernd Wulff, Stephanskirchen; Johann Stacheter, Hogling, all of Fed. Rep. of Germany

[73] Assignee: Alpha Alpenland Maschinenbau Hain & Co., K.G., Munich, Fed. Rep. of Germany

[21] Appl. No.: 50,855

[22] Filed: Jun. 21, 1979
(Under 37 CFR 1.47)

[30] Foreign Application Priority Data

Jun. 21, 1978 [DE] Fed. Rep. of Germany ....... 2827257

[51] Int. Cl.³ .................... A01J 25/00; A23C 19/076
[52] U.S. Cl. ......................................... 99/455; 99/459; 99/517; 366/296
[58] Field of Search .................................. 99/452–456, 99/460–466, 517, 483; 366/240, 293, 295, 296, 102–104, 167, 173, 276; 426/34, 36, 38, 582, 519

[56] References Cited

U.S. PATENT DOCUMENTS

| | | | |
|---|---|---|---|
| 1,001,851 | 8/1911 | Hunter | 366/296 |
| 2,005,996 | 6/1935 | Kraft | 99/452 |
| 2,917,827 | 12/1959 | Lankford | 99/466 |
| 2,980,538 | 4/1961 | Wolf | 99/458 |
| 3,353,270 | 11/1967 | Simon | 366/295 |
| 3,368,723 | 2/1968 | Hardeman | 366/276 |
| 4,108,057 | 8/1978 | Hain et al. | 99/460 |

*Primary Examiner*—Philip R. Coe
*Assistant Examiner*—Timothy F. Simone
*Attorney, Agent, or Firm*—William A. Drucker

[57] ABSTRACT

In the production of cottage and similar fresh cheese, of the kind in which a milk coagulate is cut to curd granules of suitable size, the granular structure of the curd is maintained by stirring the cheese curd-whey mixture, the curd granulate is scalded by heating, and the curd granulate thus treated, after extraction of the whey in the meantime, is washed and cooled in water and iced water, the improvement that the cheese-whey mixture is subjected to successive processing operations in a continuous flow.

11 Claims, 3 Drawing Figures

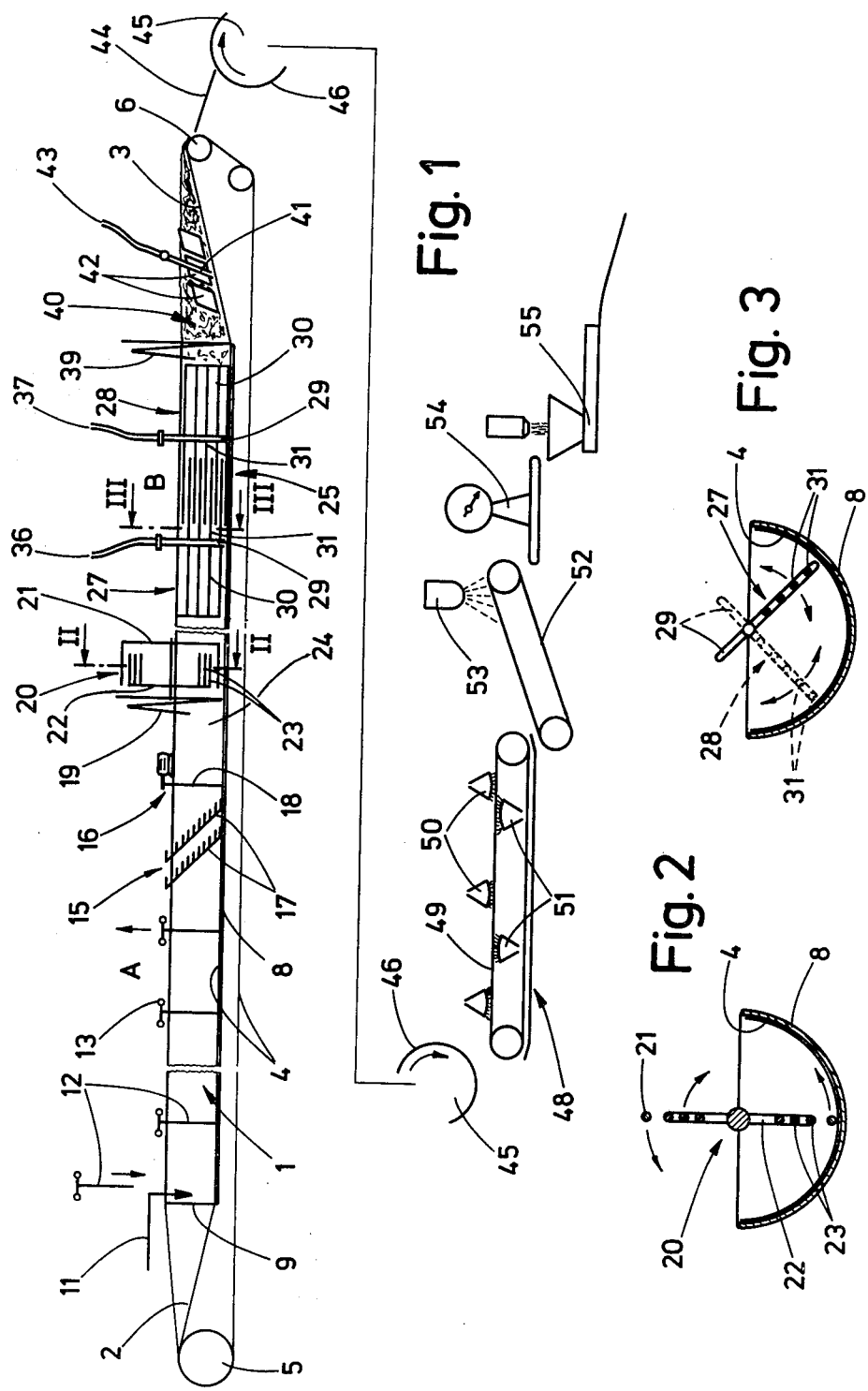

CHEESE MANUFACTURE

BACKGROUND OF THE INVENTION

This invention relates to an apparatus for the manufacture of cottage or similar fresh cheese, wherein a milk coagulate is cut to a curd granulate, the granular structure of the curd is maintained by stirring the curd-whey mixture and subsequently leaving it to settle, the curd granulate is "scalded" by heating, and finally the curd granulate treated in this manner, after meanwhile having had the whey extracted, is washed and cooled with water and iced water.

THE PRIOR ART

Hitherto, all the above-mentioned processing operations for the manufacture of cottage cheese have been carried out in stationary open tubs, in which the thickening of the milk can take place. When the coagulate is formed, it is cut, by means of cutting tools in the tub, into curd granules of the required size. Subsequently the curd is left to stand for a short time, as a result of which whey comes out of the granules, and its solidity increases. Subsequently the curd-whey mixture is kept in motion by stirring, so that the curd granules do not stick together again.

At this stage the heating of the curd-whey mixture for the so-called "scalding" of the curd granulate may also begin. The scalding temperatures are approximately 55° and 65° C. By means of this scalding the correct granule texture and solidity are achieved.

In order that the granules shall not cohere, light stirring is also effected during scalding. After scalding, extraction of the whey takes place in order to obtain a curd granulate of suitable consistency. The remaining cheese granulate is finally washed and cooled first with water and then with iced water, until the cheese granulate has assumed the characteristics typical of cottage cheese.

Finally, the taste of the relatively dry cheese granulate can be improved with cream and cooking salt. The carrying out of these treatment operations in one and the same tub is very complicated, laborious and also time-consuming, because the cutting and stirring devices must be placed in the tub and after each operation must also be removed from the tub. In particular, removal of the whey and washing take a long time, because the whey and water must be drained from the tub. Further, the removal of the treated cheese granulate from the tub is also very complicated. Because all the operations carried out in a tub can only be effected one after the other, and mostly only with considerable intervals and waiting time, relatively long production time occur. Even if, as is customary, tubs with a volumetric capacity of from 8 to 10,000 liters of milk are used, such an operating load considerably restricts the total throughput performance of a commercial firm.

In the production of milk coagulate a continuous method of operation is already known from German Patent Specification DE-AS No. 18 10 154, in which the milk is fed to a horizontal trough-shaped container which is fitted with a movable internal wall and which conveys the milk and the resulting coagulate to a cutting device installed at the end of the container. By means of this movable coagulator wall, the milk introduced in a practically still condition is brought to coagulation.

According to another device of this type disclosed in German Patent Specification DE-AS No. 24 06 616 the coagulate is cut at the end of the coagulator by means of a longitudinal and diagonal cutter, in which a cutting spiral, the knife blade of which subdivides the container space, is also used. With these known appliances it is however only possible to produce a cheese curd-whey mixture which is delivered at the container trough end by the movable internal wall to a device for shaping and portioning pieces of cheese.

OBJECT OF THE INVENTION

The object of the invention is to provide a method and an apparatus for the manufacture of cottage or similar fresh cheese, which simplifies, facilitates and above all shortens the time of the operation considerably.

SUMMARY OF THE INVENTION

The method used for the solution of this problem according to the invention is characterised in that the cheese curd-whey mixture is subjected to a successive continuous flow of processing operations necessary for the manufacture of cottage cheese.

When the milk coagulate, obtained in a cheese tub or by other means, is cut and the cheese curd-whey mixture is subsequently transported in a flow, e.g. by means of a conveyor device, and then conducted through successive processing stations, not only is the most even and intensive possible treatment of the cheese curd granulate achieved, but also the processing operations are considerably simplified and facilitated, because the individual processing devices remain in situ and may also be adapted specially to the purpose to be served and to the corresponding arrangement. Because in this way there are no interim and waiting periods between the individual processing operations, and because there is no no-load operation either, a considerable acceleration of the total production process, and consequently a substantial increase in throughput performance, is achieved.

The method is particularly advantageous if the cheese curd-whey mixture is produced in known manner from a coagulate in motion in a trough-shaped container with a movable internal wall and is subsequently immediately subjected to the consecutive processing operations while maintaining this continuous flow.

A simple and advantageous apparatus for putting the method into effect according to the invention is characterised by a trough-shaped container with a movable conveyor wall, which runs along the container wall adjacent thereto and is closed by means of a return run to an endless conveyor, a feed device for the cheese curd-whey mixture at the inlet end of the conveyor wall, a first agitator near the feed device and, at a distance therefrom, a further stirring device for the mixture, circulation pipes discharging into the container within reach of this stirring device for the feeding of the heated whey, an outlet pourer formed at the outlet end of the container, going up to the container edge, a stirrer fitted on this outlet pourer, a whey rinsing pipe discharging into this outlet pourer, a whey discharge device connected to the outlet pourer, and a washing device equipped with a conveyor for the curd granulate from which the whey has been extracted.

This apparatus keeps the cheese curd-whey mixture to be treated in motion and feeds it to the individual processing stations, where simple tools are fitted, properly controllable and separated from each other, and ensuring efficient and optimum treatment of the curd granulate. This apparatus, set up as a free-standing plant, can be fed with a cheese curd-whey mixture with curd granules of suitable characteristics and size, obtained in the usual manner, e.g. in a stationary tub, a mechanically-operating curd preparer or a coagulator with a movable internal wall.

A particularly advantageous form of the apparatus is one in which the trough-shaped container is formed as an extension to a trough-shaped coagulator and the conveyor wall can then also be an extension of the movable internal wall of the coagulator. For the separation between the treatment device and the coagulator, a simple separation spiral is used. In this arrangement there is no transfer of the cheese curd-whey mixture from a curd preparer into the apparatus for the production of cottage cheese. Moreover the flow speed through the apparatus of the mixture to be treated is adapted to the coagulator speed, so that at the end of the apparatus the result is a quantity of cottage cheese which corresponds to the quantity of milk fed into the front of the coagulator.

Further features of the invention are disclosed in the appended claims.

Further details of the invention will be apparent from the following description of the embodiment shown in the accompanying drawing.

BRIEF DESCRIPTION OF THE DRAWINGS

In the drawing:

FIG. 1 is a diagrammatic side view of a cottage cheese preparer connected to a coagulator;

FIG. 2 is a cross section taken along the line II—II in FIG. 1, and

FIG. 3 is a cross section taken along the line III—III in FIG. 1.

DESCRIPTION OF THE PREFERRED EMBODIMENT

The apparatus consisting of a coagulator A and a cottage cheese preparer B comprises essentially a semicircular elongated container 1 with rising inlet and outlet ends 2 and 3 as well as a movable internal conveyor wall 4 in the form of a continuous conveyor belt rotating around guide rollers 5 and 6, which belt on the inside lies on a container contour wall 8 and moves on the latter at a predetermined speed. At the inlet end 2 the flexible conveyor wall is rounded and shaped as it enters to correspond to a trough adapted to the container, and is again shaped at the rising outlet end 3 so that it can be led over guide rollers at the container ends and be brought into continuous rotation. At the inlet end 2 a stationary enclosing wall 9 bounds one end of the coagulator A. A milk intake pipe 11 leads into the coagulator via this enclosing wall. In the coagulator there are fitted partition walls 12 which rest upon the conveyor wall and move together with the latter. These partition walls running, supported by rollers 13 on a rail guide (not shown), dip into the coagulator at the container inlet end and out again at the coagulator end, as shown by the respective arrows, whence they are guided back again to the inlet end. At the coagulator end there is a longitudinal cutter 15 and a connecting cross cutter 16 for cutting the coagulate to the predetermined granule size of the cheese curd. The longitudinal cutter consists of cutting wires 17 moving to and fro and adapted to the volume of the container. The cross cutter consists of a rotating stub knife 18, which for the formation of the curd granules passes rapidly at suitable spacings through the bars of cheese left formed by the longitudinal cutter. Coagulator A is bounded at its outlet end by a separation spiral 19. This separation spiral consists of a spiral winding the edge of which is as close as possible to the conveyor wall and thus ensures adequate closing. Its speed of rotation is adapted to the primary movement of the conveyor wall, so that the separation spiral also conveys the cheese curd-whey mixture produced in the coagulator into cheese preparer B.

At the inlet end of the cheese preparer B, there is a stirrer 20 with two stirring forks 21, 22 put coaxially positioned and rotating in opposite directions, and having rods 23 parallel to the axis of rotation. These stirring forks may be connected to the separation spiral and have a common drive (not shown). The task of the stirrer is to keep the mixture entering into the cheese preparer in motion, so that the fresh curd granules do not cohere into large lumps. The speed of rotation of these stirring forks is low, so that in spite of an intensive stirring action, the curd granules are kept intact and not broken up. In front of the separation spiral 19 there is a resting area 24, in which the mixture can stand for a short time. The curd granules thus consolidate and allow whey to emerge. The resting areas is only indicated schematically in the drawing. In practice it consists of a suitably large distance between the processing apparatuses. In an adjacent so-called scalding area 25, in which the mixture is gradually heated to a scalding temperature of from 55° to 65° C., there is a further stirring device, consisting for example of two stirring blades 27, 28 which swing to and fro in a container trough around an axis longitudinal to the container. These stirring blades 27, 28 consist of a stirring grid 30 projecting from one side of a swing arm 29, and stirring rods 31 projecting on the other side. The stirring rods of both stirring blades are staggered in the radial direction so as to be able to pass one between the other. Within the range of scalding area 25 at least two circulation pipes 36 and 37 discharge into the container. By these, the whey required for the "scalding" of the curd granules, which for instance has been obtained and heated at the end of the device, is fed into the mixture. In order for heating of the mixture to take place gradually, whey heated to a lower temperature flows from the first circulation pipe 36. The heated whey can thereby discharge from the circulation pipes directly into the container trough or can also be fed and distributed through openings in the swing arm formed as a flow pipe or stirring device. Whey at a higher temperature is fed through circulation pipe 37, to reach the final scalding temperature of approximately 55° to 65° C. As a result of the heat effect the extraction of the whey from the curd granules is hastened and these thus become even more hardened and encapsulated.

For further treatment the mixture with the scalded curd granules arrives at a rising outlet pourer 40. In order to avoid a reflux, here again a separation spiral 39 has been incorporated. In this pouring area there is a stirrer 41 with stirring plates 42 which keep the mixture in constant motion, handling the curd granules very carefully. At this point there is also a whey rinsing pipe 43 which serves for subsequent heating of the mixture, but principally however for the regulation of the liquid level so that the curd granules may float away as freely as possible over the upper pouring edge on to a slide surface 44 which leads to a rotating whey extraction drum 45. This whey extraction drum has a strainer casing 46 through which the whey is drained into the drum, while the curd granules stay on the strainer casing and fall into a washing device 48. This consists essentially of a conveyor belt 49 with top and bottom spray nozzles 50, 51. Here the curd granules are washed, i.e. with progressively cooler water and finally with iced water at approximately 2° C. The purpose of this washing is to remove the lactic acids, the milk sugar and further milk salts as far as possible. As a result of the cooling the curd granules finally assume the typical characteristics of cottage cheese. After dehydration the relatively dry curd granules goes to a further conveyor 52 with a salt sprinkler 53, a conveyor-type weigher 54 and finally a cream adding device 55, before it is filled into tubs and packed. The salt may also be added with the cream.

In the embodiment shown, the production process is carried out, from milk preparation through to the packaging of the cottage cheese, in a continuous, fully-automatic and mechanical movement. Manual operation is completely eliminated. The individual processing operations follow one after another in an independent and insofar as necessary separated operating method, so that each operation can be carried out independently and with adequate intensity.

The invention is not restricted to the embodiment shown, and the possibility exists of making the cheese preparer B as an independent device, in which case the separation spiral 19 is not used and therefore the container begins with a rising inlet for the rotating conveyor wall. An additional inlet arrangement is formed in such a manner that it will take up the cheese curd-whey mixture produced in a separate plant and bring it into the container.

Instead of the stirring devices shown, the stirring arrangements may also be provided with different stirring tools. The whey suction and return for the purpose of heating may also be connected to a whey drain for reduction of the whey content in the mixture, so that whey may already be removed starting from the scalding area, insofar as this is beneficial.

We claim:

1. Apparatus, for the production of cottage or similar fresh cheese, comprising:
   (i) an elongated trough-shaped container having an inlet end and an outlet end,
   (ii) an endless conveyor belt having an upper run and a return run, the upper run entering the container at the inlet end and passing along the container to form a moving conveyor trough therein and leaving the container at the outlet end,
   (iii) means for feeding cheese curd-whey mixture onto the conveyor at the inlet end,
   (iv) first stirrer means dipping into the conveyor trough downstream of the inlet end,
   (v) second stirrer means dipping into the conveyor trough downstream of the first stirrer means
   (vi) circulation pipes discharging into the conveyor trough within the zone of operation of said second stirrer means for feeding in heated whey
   (vii) an outlet pourer formed at the outlet end of the container and rising to the container edge.
   (viii) third stirrer means on said outlet pourer
   (ix) a circulation pipe for whey rinsing discharging into said outlet pourer,
   (x) a whey discharge device connected to the outlet pourer, and
   (xi) a washing device, including an endless belt conveyor, for curd granulate from which whey has been extracted.

2. Apparatus, according to claim 1, wherein a portion of said container and endless conveyor belt therein situated between the inlet end and the first stirrer means constitutes a coagulator, and wherein a separation worm dips into said conveyor trough between said coagulator and said first stirrer means.

3. Apparatus according to claim 2 comprising common drive means connected to said first stirrer means and to said separation worm.

4. Apparatus, according to claim 3, wherein each circulation pipe is connected to a respective swing arm and/or to a respective stirring grid and to a stirring rod constituting a flow pipe.

5. Apparatus, for the production of cottage or similar fresh cheese, comprising:
   (i) an elongated trough-shaped container having an inlet end and an outlet end,
   (ii) an endless conveyor belt having an upper run and a return run, the upper run entering the container at the inlet end and passing along the container to form a moving conveyor trough therein and leaving the container at the outlet end,
   (iii) means for feeding cheese curd-whey mixture onto the conveyor at the inlet end,
   (iv) first stirrer means dipping into the conveyor trough downstream of the inlet end, said first stirrer means comprising two sets of coaxial stirrer forks rotatable in opposite directions about an axis longitudinal to the elongation of the container, and stirrer rods parallel to said axis,
   (v) second stirrer means dipping into the conveyor trough downstream of the first stirrer means,
   (vi) circulation pipes discharging into the conveyor trough within the zone of operation of said second stirrer means for feeding in heated whey
   (vii) an outlet pourer formed at the outlet end of the container and rising to the container edge,
   (viii) third stirrer means on said outlet pourer
   (ix) a circulation pipe for whey rinsing discharging into said outlet pourer,
   (x) a whey discharge device connected to the outlet pourer, and
   (xi) a washing device, including an endless belt conveyor, for curd granulate from which whey has been extracted.

6. Apparatus, for the production of cottage or similar fresh cheese comprising:
   (i) an elongated trough-shaped container having an inlet end and an outlet end,
   (ii) an endless conveyor belt having an upper run and a return run, the upper run entering the container at the inlet end and passing along the container to form a moving conveyor trough therein and leaving the container at the outlet end,
   (iii) means for feeding cheese curd-whey mixture onto the conveyor at the inlet end,
   (iv) first stirrer means dipping into the conveyor trough downstream of the inlet end,
   (v) second stirrer means dipping into the conveyor trough downstream of the first stirrer means, said second stirrer means comprising two stirrer blades rotatable about an axis longitudinal of the container, said blades being disposed one upstream and the other downstream, each said blade including a swing arm and a stirring grid projecting longitudinally of the container, and stirring rods rotated in opposite directions, the stirring rods of both stirring blades being opposed and interengaged, (vi) circulation pipes discharging into the conveyor trough within the zone of operation of said second stirrer means for feeding in heated whey, (vii) an outlet pourer formed at the outlet end of the container and rising to the container edge, (viii) third stirrer means on said outlet pourer, (ix) a circulation pipe for whey rinsing discharging into said outlet pourer, (x) a whey discharge device connected to the outlet pourer, and (xi) a washing device, including an endless belt conveyor, for curd granulate from which whey has been extracted.

7. Apparatus, as claimed in claim 6, wherein each said stirrer blade is provided with one of said heated whey circulation pipes.

8. Apparatus, as claimed in claim 7, wherein each circulation pipe is connected to a respective swing arm and/or to a respective stirring grid and to a stirring rod constituting a flow pipe.

9. Apparatus, for the production of cottage or similar fresh cheese, comprising:

(i) an elongated trough-shaped container having an inlet end and an outlet end, (ii) an endless conveyor belt having an upper run and a return run, the upper run entering the container at the inlet end and passing along the container to form a moving conveyor trough therein and leaving the container at the outlet end, (iii) means for feeding cheese curd-whey mixture onto the conveyor at the inlet end, (iv) first stirrer means dipping into the conveyor trough downstream of the inlet end, (v) second stirrer means dipping into the conveyor trough downstream of the first stirrer means, (vi) circulation pipes discharging into the conveyor trough within the zone of operation of said second stirrer means for feeding in heated whey, (vii) an outlet pourer formed at the outlet end of the container and rising to the container edge, (viii) third stirrer means on said outlet pourer, (ix) a circulation pipe for whey rinsing discharging into said outlet pourer, (x) a whey discharge device connected to the outlet pourer, (xi) a whey extracting strainer drum disposed downstream of the outlet pourer, (xii) a washing device, including an endless belt conveyor, for curd granulate from which whey has been extracted.

10. Apparatus, for the protection of cottage or similar fresh cheese, comprising:

(i) an elongated trough-shaped container having an inlet end and an outlet end, (ii) an endless conveyor belt having an upper run and a return run, the upper run entering the container at the inlet end and passing along the container to form a moving conveyor trough therein and leaving the container at the outlet end, (iii) means for feeding cheese curd-whey mixture onto the conveyor at the inlet end, (iv) stirrer means dipping into the conveyor trough downstream of the inlet end, said stirrer means comprising two sets of coaxial stirrer forks rotatable in opposite directions about an axis longitudinal to the elongation of the container, and stirring rods parallel to said axis.

11. Apparatus, for the production of cottage or similar fresh cheese, comprising:

(i) an elongated trough-shaped container having an inlet end and an outlet end, (ii) an endless conveyor belt having an upper run and a return run, the upper run entering the container at the inlet end and passing along the container to form a moving conveyor trough therein and leaving the container at the outlet end, (iii) means for feeding cheese curd-whey mixture onto the conveyor at the inlet end, (iv) first stirrer means dipping into the conveyor trough downstream of the inlet end, (v) second stirrer means dipping into the conveyor trough downstream of the first stirrer means, said second stirrer means comprising two stirrer blades rotatable about an axis longitudinal of the container, said blades being disposed one upstream and the other downstream, each said blade including a swing arm and a stirring grid projecting longitudinally of the container, and stirring rods rotated in opposite directions, the stirring rods of both stirring blades being opposed and interengaged.

* * * * *